United States Patent
Dietsche et al.

(10) Patent No.: US 7,977,434 B2
(45) Date of Patent: Jul. 12, 2011

(54) POLYMERIC HYDROPHOBIC AMINONITRILE QUATS USED FOR BLEACH ACTIVATION

(75) Inventors: Frank Dietsche, Schriesheim (DE); Alfred Oftring, Bad Duerkheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 816 days.

(21) Appl. No.: 11/815,410

(22) PCT Filed: Jan. 25, 2006

(86) PCT No.: PCT/EP2006/050428
§ 371 (c)(1),
(2), (4) Date: Nov. 29, 2007

(87) PCT Pub. No.: WO2006/082153
PCT Pub. Date: Aug. 10, 2006

(65) Prior Publication Data
US 2008/0139772 A1    Jun. 12, 2008

(30) Foreign Application Priority Data
Feb. 3, 2005    (DE) .................... 10 2005 005 016

(51) Int. Cl.
*C11D 11/00*    (2006.01)
*C11D 3/39*    (2006.01)
*C08G 73/02*    (2006.01)

(52) U.S. Cl. ............ 525/509; 8/401; 162/1; 162/72; 435/183; 435/201; 510/101; 510/108; 510/276; 510/444; 525/328.2; 525/515; 525/417

(58) Field of Classification Search ........... 525/328.2, 525/509, 515, 417; 162/1, 72; 435/183, 435/201; 8/401; 510/101, 108, 276, 444
See application file for complete search history.

(56) References Cited

U.S. PATENT DOCUMENTS

| | | | |
|---|---|---|---|
| 3,424,790 A * | 1/1969 | Hamilton et al. ............ 525/417 |
| 5,661,118 A | 8/1997 | Cauwet et al. |
| 5,707,542 A | 1/1998 | Deline et al. |
| 6,338,842 B1 | 1/2002 | Restle et al. |

FOREIGN PATENT DOCUMENTS

| | | |
|---|---|---|
| DE | 196 05 526 | 8/1997 |
| DE | 100 38 844 | 2/2002 |
| DE | 100 57 045 | 5/2002 |
| DE | 102 11 389 | 9/2003 |
| EP | 0 303 520 | 2/1989 |
| GB | 1 598 610 | 9/1981 |
| WO | WO 98/23534 | 6/1998 |

OTHER PUBLICATIONS

Loeffler, et al., "Neue reaktive Bleichaktivatoren-eine Gratwanderung zwischen Bleicheffizienz und Farb-/Faserschaedigung", Tenside Surf. Det., vol. 34, No. 6, pp. 404-409, 1997.

* cited by examiner

*Primary Examiner* — Ana L Woodward
(74) *Attorney, Agent, or Firm* — Oblon, Spivak, McClelland, Maier & Neustadt, L.L.P.

(57) ABSTRACT

The present invention relates to a polymer for use as a bleach activator, comprising the monomer units

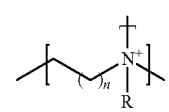

A1

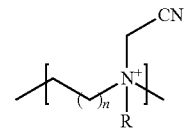

A2

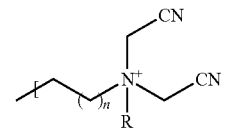

A3 where n is an integer from 1 to 4 and R is a branched or unbranched, saturated hydrocarbyl radical having from 1 to 20 carbon atoms, to processes for the preparation and to the use thereof as laundry detergents, cleaning compositions and disinfectant compositions, and also in textile bleaching and paper bleaching.

16 Claims, No Drawings

POLYMERIC HYDROPHOBIC AMINONITRILE QUATS USED FOR BLEACH ACTIVATION

This application is a 371 of PCT/EP06/50428 filed Jan. 25, 2006, and claims priority to German application 10 2005 005 016.6 filed Feb. 3, 2005.

The present invention relates to a polymer for use as a bleach activator with ammonionitrile units, to processes for the preparation and to the use thereof as laundry detergents, cleaning compositions and disinfectant compositions, and also in textile bleaching and paper bleaching.

Bleach activators having ammonionitrile units (aminonitrile quats) have been known for some time.

Compared to other bleach activators, such nitrile quats have the particular feature that they can enable continuous bleaching activity over a wide temperature window from 20 to 60° C. In addition, they can be handled efficiently, since they are generally solid, water-soluble and low in odor.

Nitrile quats have high activity. They usually exhibit an activity enhanced by a factor 5 in comparison to TAED at 20° C. in addition, their low pH dependence should be pointed out.

Comparisons of currently used bleach activators in relation to their bleaching activity and color damage have been investigated by Reinhardt et al. in Tenside Surf. Det. 34 (1997) 6, 404-409 in these investigations, nitrile quats showed good results.

Nitrile quats which are frequently mentioned in the literature are monomeric ammonioacetonitrile salts of the formula $R^1R^2R^3N^+$—$CH_2$—$CNX^-$, where $R^1$ to $R^3$ are generally alkyl groups.

DE-A 102 11 389 likewise describes such salts in which at least two radicals represent a hydrocarbon chain having at least 4 carbon atoms.

DE-A 196 05 526 likewise discloses salts of the abovementioned type for use as bleach activators, except that two radicals on the nitrogen together with the nitrogen to which they are bonded form a heterocycle.

DE-A 100 38 844 describes cationic bleach activators in analogy to the formula specified above, the anion being a cumenesulfonate.

Finally, DE 100 57 045 discloses particulate bleach activators based on acetonitriles of the above formula.

Ammonium-substituted benzonitriles are the subject matter of U.S. Pat. No. 5,707,542.

Bleaches having linear low molecular weight polymers based on ammonioacetonitrile are described in EP-A 303 520.

Nitrite quats as they are known from the prior art, however, also have some disadvantages.

Firstly, they may bring about significant color damage as a result of their high fiber affinity. In addition, they harbor a residual endangerment potential and can have a sensitizing action. In addition, the nitrile quats according to the prior art constitute a danger to the environment at least to a certain degree since, in spite of rapid hydrolysis, they are barely biodegradable, if at all, and instead are only bioeliminable.

There is therefore still a need for nitrile quats which do not have at least some of the disadvantages present in the prior art, or do not have them to the same degree, and nevertheless have comparable or superior bleach activation properties.

It is thus an object of the present invention to provide improved nitrile quats which do not have at least some of the disadvantages of the prior art, or have them to a reduced degree, and/or can nevertheless have comparable or superior bleach activation properties, especially in the case of hydrophobic soilings.

The object is achieved by a polymer for use as a bleach activator, comprising the monomer units

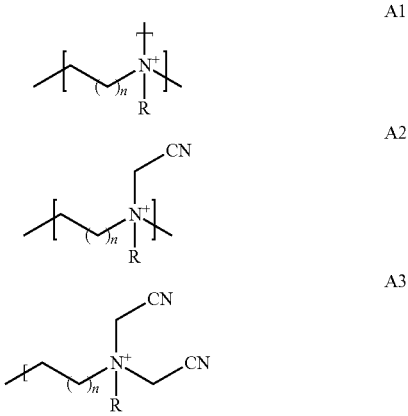

where n is an integer from 1 to 4 and R is a branched or unbranched, saturated or unsaturated, optionally oxygen-interrupted hydrocarbyl radical having from 1 to 20 carbon atoms.

It has been found that, presumably as a result of the polymeric nature of the inventive bleach activator and in particular as a result of the additional presence of the monomer unit A1, improved properties can be achieved.

For instance, it is possible to prevent the health-damaging effects of nitrile quats or to reduce their disadvantageous action by virtue of a lower permeability through, for example, skin compartments. A lower cation density can preferably also be established in the inventive polymer, which can lead to reduced fiber affinity and color and fiber damage.

In particular, the polymer of the present invention is suitable for removing especially hydrophobic soilings, especially in the case of body fats or oils (native or synthetic), very particularly at low temperatures, preferably at from 0° C. to 25° C.

In A1, A2 and A3, n reports the number of the further methylene groups to the group which is already present in each case. n may assume the values of 1, 2, 3 or 4. Preferably, n=1.

In A1, A2 and A3, R represents a branched or unbranched, saturated or unsaturated, optionally oxygen-interrupted hydrocarbyl radical having from 1 to 20 carbon atoms. The hydrocarbyl radical is preferably an aliphatic acyclic hydrocarbyl radical. An oxygen-interrupted hydrocarbyl radical preferably further has, exclusively or partly, ethoxy and propoxy, butoxy or pentoxy units. In particular, the hydrocarbyl radical is a $C_1$-$C_{20}$ alkyl chain. R is most preferably methyl, ethyl, n-propyl, isopropyl, n-butyl, isobutyl or tert-butyl.

The polymer of the present invention is preferably based on polyalkyleneimines, or is prepared from them Especially preferred are polyethyleneimines as starting compounds. However, the starting compounds may also be other polymers or be copolymers or block polymers, in which case at least one component is preferably a polyalkyleneimine. Useful further components are, for example, aliphatic or aromatic polyethers, amine-terminated polymers, for example Jeffamine® from Huntsman (The Woodlands, USA), or physical mixtures thereof.

In addition, further monomer units may occur in the polymer. For instance, uncharged derivatives of A1, A2 and A3 in which the R group is absent may occur. Derivatives of A2 and A3 in which one or both cyanomethyl groups have been replaced by R may also be present as monomer units in the polymer of the present invention.

R is present two or three times preferably in at most 25%, further preferably in at most 50%, more preferably in at most 75%, of the monomer units present in the polymer of the present invention.

The ratio of positively charged monomer units to uncharged monomer units is likewise preferably at least 0.25, preferably at least 1, more preferably at least 5, even more preferably at least 10, even more preferably 20, most preferably 100.

The log P value of the polymer of the present invention is preferably from −3 to 6.5, more preferably from −2 to 4 and particularly preferably from −1 to 2.5. The log P is defined as the logarithm of the partition coefficient of a substance in an octanol-water mixture. The log P value is normally below −1 in the case of low activity and a value above 1 is observed in the case of higher activity.

As the counter ion to the positively charged groups in the polymer, anions known per se to those skilled in the art may be used. Examples thereof are chloride, bromide, iodide, fluoride, sulfate, hydrogensulfate, carbonate, hydrogencarbonate, phosphate, mono- and dihydrogenphosphate, pyrophosphate, metaphosphate, nitrate, metasulfate, dodecylsulfate, dodecylbenzenesulfonate, phosphonate, methylphosphonate, methanedisulfonate, methylsulfonate, ethanesulfonate, toluenesulfonate, benzenesulfonate or cumenesulfonate.

The monomer units A1, A2 and A3 and any other units present may if appropriate in each case be distributed randomly or in blocks in the polymer. The (molar) proportion of each of the monomer units A1, A2 and A3 in the polymer is preferably in each case independently in the range from 0.01 to 0.5, more preferably in the range from 0.05 to 0.4.

The average molecular mass of the polymer of the present invention is preferably in the range from 500 g/mol to 500 000 g/mol. The average molecular mass is preferably in the range from 500 g/mol to 50 000 g/mol, in particular from 800 g/mol to 25 000 g/mol and most preferably in the range from 1000 g/mol to 5000 g/mol.

The polymer of the present invention can be prepared by methods known per se.

One process for preparing the polymer comprises the steps of:
a) reacting a polymer comprising the monomer units

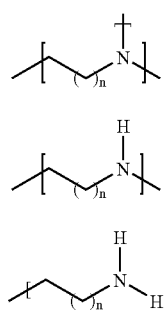

where n is an integer from 1 to 4 with hydrogen cyanide and formaldehyde;
b) reacting the product from a) with a reagent for introducing the R group, R being as defined above.

The polymer in step a) is preferably a polyalkyleneimine. Especially preferred are polyethyleneimines as starting compounds. However, the starting compounds may also be other polymers or be copolymers of which one component is preferably a polyalkyleneimine.

The reagent for introducing the R group is preferably an alkylating reagent such as dialkyl sulfate or alkyl iodide, or alkoxylation reagents, preferably ethylene oxide, propylene oxide or butylene oxide. Very particular preference is given to dimethyl sulfate.

The polymer of the present invention is suitable for use in bleaching compositions, detergent compositions and disinfectant compositions, and in particular in textile bleaching and paper bleaching.

The polymer of the present invention may also be coated and used in combination with other bleach activators. These are, for example, compounds which, under perhydrolysis conditions, give rise to aliphatic peroxocarboxylic acids having preferably from 1 to 10 carbon atoms, in particular from 2 to 4 carbon atoms, and/or optionally substituted perbenzoic acid. They are frequently bleach activators which comprise one or more N- or O-acyl groups and/or bear optionally substituted benzoyl groups, such as substances from the class of the anhydrides, of the esters, of the imides and of the acylated imidazoles or oximes. Examples thereof are tetraacetylethylenediamine (TAED), tetraacetylmethylenediamine (TAMD), tetraacetylglycoluril (TAGU), tetraacetylhexylenediamine (TAHD), N-acylimides, in particular N-nonanoylsuccinimide (NOSI), acylated phenolsulfonates, in particular n-nonanoyl- or isononanoyloxybenzenesulfonates (n- and iso-NOBS respectively) and lauroyloxybenzenesulfonates (LOBS), pentaacetylglucose (PAG), 1,5-diacetyl-2,2-dioxohexa-hydro-1,3,5-triazine (DADHT) and isatoic anhydride (ISA).

In combination with the polymer of the present invention, it is also possible to use bleach activators from the group consisting of carboxylic anhydrides, in particular phthalic anhydride, acylated polyhydric alcohols, in particular triacetin, ethylene glycol diacetate, 2,5-diacetoxy-2,5-dihydrofuran and the enol esters known from the German patent applications DE 196 16 693 and DE 196 16 767, and also acetylated sorbitol and mannitol or their mixtures described in the European patent application EP 0 525 239 (SORMAN), acylated sugar derivatives, in particular pentaacetyl glucose (PAG), pentaacetylfructose, tetraacetylxylose and octaacetyllactose, and acetylated, optionally N-alkylated glucamine and gluconolactone, and/or N-acylated lactams, for example N-benzoylcaprolactam and carbonylbiscaprolactam, which are known from the International patent applications WO 94/27970, WO 94/28102, WO 94/28103, WO 95/00626, WO 95/14759, WO 95/17498 and WO 96/36686, and also bis(2-propylimino)carbonate; see DE-A 195 18 039, 195 41012, 196 09 953 and 197 04 149.

Also suitable in combination with the polymer of the present invention are the hydrophilically substituted acyl acetals known from the German patent application DE 196 16 769, and the acyl lactams described in the German patent application DE 196 16 770 and the international patent application WO 95/14075.

In addition to the conventional bleach activators listed above or in their stead, it is also possible to combine the sulfonimines known from the European patents EP-A 0 446 982 and EP-A 0 453 003 and/or bleach-boosting transition metal salts or transition metal complexes, as what are known as bleach catalysts, with the polymer of the present invention.

The possible transition metal compounds include in particular the manganese-, iron-, cobalt-, ruthenium- or molybdenum-saline complexes known from the German patent application DE 195 29 905 and their N-analog compounds known from the German patent application DE 196 20 267, the manganese-, iron-, cobalt-, ruthenium- or molybdenum-carbonyl complexes known from the German patent application DE 195 36 082, the manganese, iron, cobalt, ruthenium, molybdenum, titanium, vanadium and copper complexes which have nitrogen-containing tripod ligands and are described in the German patent application DE 196 05 688, the cobalt-, iron-, copper- and ruthenium-amine complexes known from the German patent application DE 196 20 411, the manganese, copper and cobalt complexes described in the German patent application DE 44 16 438, the cobalt complexes described in the European patent application EP-A 0 272 030, the manganese complexes known from the European patent application EP-A 0 693 550, the manganese, iron, cobalt and copper complexes known from the European patent EP-A 0 392 592, and/or the manganese complexes described in the European patent EP-B 0 443 651 or the European patent applications EP-A 0 458 397, EP-A 0 458 398, EP-A 0 549 271, EP-A 0 549 272, EP-A 0 544 490 and EP-A 0 544 519.

In combination with the polymer of the present invention, bleach-boosting transition metal complexes, in particular with the central atoms Mn, Fe, Co, Cu, Mo, V, Ti and/or Ru, preferably selected from the group of the manganese and cobalt salts and complexes, more preferably the cobalt(ammine) complexes, the cobalt(acetate) complexes, the cobalt (carbonyl) complexes, the chlorides of cobalt and of manganese and of manganese sulfate, may be selected. These bleach-boosting transition metal complexes may be used in customary amounts, preferably in an amount up to 5% by weight, in particular from 0.0025% by weight to 1% by weight and more preferably from 0.01% by weight to 0.25% by weight, based in each case on the overall detergent formulation.

Preference is given to using polyacylated alkylenediamines, in particular tetraacetylethylenediamine (TAED), N-acylimides, in particular N-nonanoylsuccinimide (NOSI), and also glucose pentaacetate (GPA), xylose tetraacetate (TAX), sodium 4-benzoyloxybenzenesulfonate (SBOBS), sodium trimethylhexanoyloxy-benzenesulfonate (STHOBS), tetraacetylglucoluril (TAGU), tetraacetylcyanoic acid (TACA), di-N-acetyldimethylglyoxime (ADMG), 1-phenyl-3-acetylhydantoin (PAH), acylated phenolsulfonates, nonanoylbenzenesulfonates (NOBS), isononanoylbenzenesulfonates (isoNOBS), lauroylbenzenesulfonates (LOBS), carbonylbiscaprolactam and bis(2-propylimino) carbonate.

The polymer of the present invention is generally used in combination with the bleaches listed in the following. Alkali metal perborates and their hydrates and alkali metal percarbonates, preference being given to using sodium perborate in the form of the mono- or tetrahydrate, or sodium percarbonate and its hydrates. It is likewise possible to use persulfates and hydrogen peroxide and typical oxygen bleaches such as organic peracids, for example perbenzoic acid, peroxy-alpha-naphthoic acid, peroxylauric acid, peroxystearic acid, phthalimidoperoxycaproic acid, nonylimideperoxysuccinic acid, nonylimideperoxyadipic acid, 1,12-diperoxydodecanedioic acid, 1,9-diperoxyazelaic acid, diperoxoisophthalic acid and 2-decyldiperoxybutane-1,4-dioic acid. Also suitable are cationic peroxy acids, as described in the patent applications U.S. Pat. No. 5,422,028, U.S. Pat. No. 5,294,362 and U.S. Pat. No. 5,292,447, and sulfonyl peroxy acids, as described, for example, in the patent application U.S. Pat. No. 5,039,447. The addition of small amounts of bleach stabilizers, for example phosphonates, borates, metaborates, metasilicates and magnesium salts, may also be sensible.

The peroxy acid-containing bleach is used in amounts which give rise to an amount of available oxygen from about 0.1% to about 10%, preferably from about 0.5% to about 5%, in particular from about 1% to 4%. The percentages are based on the total weight of the detergent composition.

The proportion of the peroxide-containing bleach in the inventive detergent compositions is from about 0.1% by weight to about 95% by weight and preferably from about 1% by weight to about 60% by weight. When the bleaching composition is also a fully formulated detergent composition, it is preferred when the proportion of the peroxide-containing bleach is from about 1% by weight to about 20% by weight.

The polymer of the present invention may also be used in combination with what are known as bleaching power enhancers. These are substances which enhance the action of the known bleaches even further. Suitable bleach activators are in particular diamines which are described in DE-A 196 11 992. These are compounds which comprise secondary amine groups $—NHR^1$ and have a low molecular weight, or are oligomeric or polymeric. In particular, they are secondary amines of the general formula $R^1NH—[(CR^3R^4)_m—NH]_n—R^2$ (II) where n is an integer from 0 to 20 and m is an integer from 2 to 4, the $R^3$ and $R^4$ radicals are independently $C_1$-$C_{30}$—, preferably $C_1$-$C_{15}$-hydrocarbyl radicals, and the $R^1$ and $R^2$ radicals are each independently $C_1$-$C_{30}$-, preferably $C_1$-$C_{15}$-hydrocarbyl radicals, or if appropriate together form a cycle. The bleaching power enhancers disclosed in DE-A 196 11 992 are an integral part of the present invention and are incorporated herein by reference.

The polymer of the present invention may be used as a bleach activator for application in laundry detergents, cleaning compositions, dishwashing compositions, stain-removal salts, disinfectant compositions, denture cleaners, fiber bleaching, for example cellulose bleaching, wood pulp bleaching or in cotton fiber bleaching and also hair bleaching. Preferred fields of use from those mentioned above are laundry detergents and dishwashing compositions.

The polymer of the present invention as a bleach activator is used in the formulations intended in each case for these fields of use preferably in amounts up to 10% by weight, in particular from 0.1% by weight to 8% by weight, particularly from 0.5 to 8% by weight and more preferably from 0.8 to 5% by weight, based on the overall formulation. Main fields of use are domestic and industrial textile laundry detergents, and domestic and industrial dishwashing formulations. The formulations in which the polymer of the present invention can be used are described by way of example for the fields of use of textile laundry detergents and machine dishwasher detergents.

Domestic Textile Laundry Detergent Composition

The laundry detergent formulations in which the polymer of the present invention can be used are in powder, granule, paste or gel form, or they are solid detergent tablets. Depending on their intended use, the compositions of the formulations are to be adapted to the type of textiles to be washed. They comprise conventional laundry detergent ingredients which correspond to the prior art. Representative examples of such laundry detergent and cleaning composition ingredients are described below.

The total concentration of surfactants in the finished laundry detergent formulation may be from 1 to 99% by weight, preferably from 5 to 80% by weight. The surfactants used may be anionic, nonionic, amphoteric or cationic. It is also possible to use mixtures of the surfactants mentioned. Preferred laundry detergent formulations comprise anionic and/or nonionic surfactants and mixtures thereof with further surfactants.

Suitable anionic surfactants are sulfates, sulfonates, carboxylates, phosphates and mixtures thereof. Suitable cations are alkali metals, for example sodium or potassium, or alkaline earth metals, such as calcium or magnesium, and also ammonium, substituted ammonium compounds, including mono-, di- or triethanolammonium cations and mixtures thereof. Amongst the anionic surfactants, preference is given to alkyl ester sulfonates, alkyl sulfates, alkyl ether sulfates, alkylbenzenesulfonates, secondary alkanesulfonates and soaps. These are described below.

Alkyl ester sulfonates include linear esters of $C_{18}$-$C_{20}$-carboxylic acids (fatty acids) which are sulfonated by means of gaseous $SO_3$, as described, for example, in "The Journal of the American Oil Chemists Society" 52 (1975), p. 323-329. Suitable starting materials are natural fats, such as tallow, coconut oil and palm oil, but also fats of a synthetic nature. Preferred alkyl ester sulfonates are compounds of the formula

(III)

in which $R^1$ is a $C_8$-$C_{20}$-hydrocarbyl radical, preferably alkyl and R is a $C_1$-$C_6$-hydrocarbyl radical, preferably alkyl, M is a cation which forms a water-soluble salt with the alkyl ester sulfonate. Suitable cations are sodium, potassium, lithium or ammonium cations, for example monoethanolamine, diethanolamine and triethanolamine. Preferably, $R^1$ is $C_{10}$-$C_{16}$-alkyl and R is methyl, ethyl or isopropyl. Most preferred are methyl ester sulfonates in which $R^1$ is $C_{10}$-$C_{16}$-alkyl.

Alkyl sulfates are water-soluble salts or acids of the formula $ROSO_3M$ in which R is a $C_{10}$-$C_{24}$-hydrocarbyl radical, preferably an alkyl or hydroxyalkyl radical with $C_{10}$-$C_{20}$-alkyl component, more preferably a $C_{12}$-$C_{18}$-alkyl or hydroxyalkyl radical. M is hydrogen or a suitable cation, for example an alkali metal cation, preferably sodium, potassium, lithium, or an ammonium or substituted ammonium cation, preferably a methyl, dimethyl and trimethylammonium cation or a quaternary ammonium cation, for example the tetramethylammonium and dimethylpiperidinium cations, and quaternary ammonium cations derived from alkylamines such as ethylamine, diethylamine, triethylamine and mixtures thereof. Alkyl chains with $C_{12}$-$C_{16}$ are preferred for low washing temperatures (e.g. below about 50° C.) and alkyl chains with $C_{16}$-$C_{18}$ are preferred for higher washing temperatures (e.g. above about 50° C.).

Alkyl ether sulfates are water-soluble salts or acids of the formula $RO(A)_mSO_3M$ in which R is an unsubstituted $C_{10}$-$C_{24}$-alkyl or hydroxyalkyl radical, preferably a $C_{12}$-$C_{20}$-alkyl or hydroxyalkyl radical, more preferably a $C_{12}$-$C_{18}$-alkyl or hydroxyalkyl radical. A is an ethoxy or propoxy unit, m is a number greater than 0, preferably between approx. 0.5 and approx. 6, more preferably between approx. 0.5 and approx. 3, and M is a hydrogen atom or a cation, for example sodium, potassium, lithium, calcium, magnesium, ammonium or a substituted ammonium cation. Examples of substituted ammonium cations comprise methyl-, dimethyl-, trimethylammonium and quaternary ammonium cations, such as tetramethylammonium and dimethylpiperidinium cations, and also those which are derived from alkylamines such as ethylamine, diethylamine, triethylamine or mixtures thereof.

Examples include $C_{12}$-$C_{18}$ fatty alcohol ether sulfates in which the content of ethylene oxide units is 1, 2, 2.5, 3 or 4 mol per mole of the fatty alcohol ether sulfate and M is sodium or potassium.

In secondary alkanesulfonates, the alkyl group may either be saturated or unsaturated, branched or linear, and may optionally be substituted by a hydroxyl group. The sulfo group may be at any position in the carbon chain, but the primary methyl groups at the start of the chain and at the end of the chain do not have any sulfonate groups. The preferred secondary alkanesulfonates comprise linear alkyl chains having from approx. 9 to 25 carbon atoms, preferably from approx. 10 to approx. 20 carbon atoms and more preferably from approx. 13 to 17 carbon atoms. The cation is, for example, sodium, potassium, ammonium, mono-, di- or triethanolammonium, calcium or magnesium and mixtures thereof. Sodium is the preferred cation.

Further suitable anionic surfactants are alkenyl- or alkylbenzenesulfonates. The alkenyl or alkyl group may be branched or linear and may optionally be substituted by a hydroxyl group. The preferred alkylbenzenesulfonates comprise linear alkyl chains having from approx. 9 to 25 carbon atoms, preferably from approx. 10 to approx. 13 carbon atoms, and the cation is sodium, potassium, ammonium, mono-, di- or triethanolammonium, calcium or magnesium and mixtures thereof. For mild surfactant systems, magnesium is the preferred cation while sodium is preferred for standard washing applications. The same applies to alkenylbenzenesulfonates.

The term anionic surfactant also includes olefinsulfonates which are obtained by sulfonation of $C_{12}$-$C_{24}$-α-olefins, preferably $C_{14}$-$C_{16}$-α-olefins, with sulfur trioxide and subsequent neutralization. As a result of the preparation process, these olefinsulfonates may comprise relatively small amounts of hydroxyalkanesulfonates and alkanedisulfonates. Specific mixtures of α-olefinsulfonates are described in U.S. Pat. No. 3,332,880.

Further preferred anionic surfactants are carboxylates, for example fatty acid soaps and comparable surfactants. The soaps may be saturated or unsaturated and may comprise various substituents, such as hydroxyl groups or α-sulfonate groups. Preference is given to linear saturated or unsaturated hydrocarbyl radicals as the hydrophobic moiety having from approx. 6 to approx. 30, preferably from approx. 10 to approx. 18, carbon atoms.

Further useful anionic surfactants include: salts of acylaminocarboxylic acids; the acyl sarcosinates which are formed by reacting fatty acid chlorides with sodium sarcosinate in an alkaline medium; fatty acid/protein condensation products which are obtained by reacting fatty acid chlorides with oligopeptides; salts of alkylsulfamidocarboxylic acids; salts of alkyl and alkylaryl ether carboxylic acids; $C_8$-$C_{24}$-olefinsulfonates; sulfonated polycarboxylic acids which are prepared by sulfonation of the pyrolysis products of alkaline earth metal citrates, as described, for example, in GB-1,082,179; alkyl glycerol sulfates; oleyl glycerol sulfates; alkylphenol ether sulfates; primary paraffinsulfonates; alkyl phosphates; alkyl ether phosphates; isethionates, such as acyl isethionates; N-acyltaurides; alkyl succinates; sulfosuccinates; monoesters of sulfosuccinates (particularly saturated and unsaturated $C_{12}$-$C_{18}$ monoesters) and diesters of sulfosuccinates (particularly saturated and unsaturated $C_{12}$-$C_{18}$ diesters); acyl sarcosinates; sulfates of alkylpolysaccharides, for example sulfates of alkylpolyglycosides, branched primary alkylsulfates and alkylpolyethoxycarboxylates, such as those of the formula $RO(CH_2CH_2)_kCH_2COO^-M^+$ in which R is $C_8$- to $C_{22}$-alkyl, k is a number from 0 to 10 and M is a cation; resin acids or hydrogenated resin acids, for example rosin or hydrogenated rosin or tall oil resins and tall oil resin acids. Further examples are described in "Surface Active Agents and Detergents" (Vol. I and II, Schwartz, Perry and Berch).

Examples of useful nonionic surfactants are, for example, the following compounds:

Polyethylene, Polypropylene and Polybutylene Oxide Condensates of Alkylphenols.

These compounds comprise the condensation products of alkylphenols having a $C_6$-$C_{20}$-alkyl group which may be either linear or branched with alkene oxides. Preference is given to compounds containing from approx. 5 to 25 mol of alkene oxide per mole of alkylphenol.

Condensation Products of Aliphatic Alcohols with from Approx. 1 to Approx. 25 mol of Ethylene Oxide.

The alkyl chain of the aliphatic alcohols may be linear or branched, primary or secondary, and generally comprises from approx. 8 to approx. 22 carbon atoms. Particular preference is given to the condensation products of $C_{10}$-$C_{20}$-alcohols with from approx. 2 to approx. 18 mol of ethylene oxide per mole of alcohol. The alkyl chain may be saturated or unsaturated. The alcohol ethoxylates may have a narrow homolog distribution ("narrow range ethoxylates") or a broad homolog distribution of the ethylene oxide ("broad range ethoxylates").

Examples of commercially available nonionic surfactants of this type are, for example, the Lutensol® brands from BASF Aktiengesellschaft.

Condensation Products of Ethylene Oxide with a Hydrophobic Base, Formed by Condensation of Propylene Oxide with Propylene Glycol.

The hydrophobic moiety of these compounds preferably has a molecular weight between approx. 1500 and approx. 1800. The addition of ethylene oxide to this hydrophobic moiety leads to an improvement in the solubility in water. The product is liquid up to a polyoxyethylene content of approx. 50% of the total weight of the condensation product, which corresponds to a condensation with up to approx. 40 mol of ethylene oxide. Commercially available examples of this product class are, for example, the Pluronic® brands from BASF Aktiengesellschaft.

Condensation Products of Ethylene Oxide with a Reaction Product of Propylene Oxide and Ethylenediamine.

The hydrophobic unit of these compounds consists of the reaction product of ethylenediamine with excess propylene oxide and generally has a molecular weight of from approx. 2500 to 3000. Ethylene oxide is added onto this hydrophobic unit until the product has a content of from approx. 40 to approx. 80% by weight of polyoxyethylene and a molecular weight of from approx. 5000 to 11 000. Commercial y available examples of this compound class are, for example, the Tetronic® products from BASF Corp.

Semipolar Nonionic Surfactants

This category of nonionic compounds comprises water-soluble amine oxides, water-soluble phosphine oxides and water-soluble sulfoxides, each having an alkyl radical of from approx. 10 to approx. 18 carbon atoms. Semipolar nonionic surfactants are also amine oxides of the formula

(IV)

where R is an alkyl hydroxyalkyl or alkylphenol group with a chain length of from approx. 8 to approx. 22 carbon atoms. $R^2$ is an alkylene or hydroxyalkylene group having from approx. 2 to 3 carbon atoms or mixtures thereof, each radical $R^1$ is an alkyl or hydroxyalkyl group having from approx. 1 to approx. 3 carbon atoms or a polyethylene oxide group having about 1 to about 3 ethylene oxide units, and x is a number from 0 to about 10. The $R^1$ groups may be joined together via an oxygen or nitrogen atom and thus form a ring. Amine oxides of this type are particularly $C_{10}$-$C_{18}$-alkyldimethylamine oxides and $C_8$-$C_{12}$-alkoxyethyldihydroxyethylamine oxides.

Fatty Acid Amides

Fatty acid amides have the formula

(V)

in which R is an alkyl group having from approx. 7 to approx. 21, preferably from approx. 9 to approx. 17, carbon atoms, and $R^1$ is in each case independently hydrogen, $C_1$-$C_4$-alkyl, $C_1$-$C_4$-hydroxyalkyl or $(C_2H_4O)_xH$ where x varies from about 1 to about 3. Preference is given to $C_8$-$C_{20}$ amides, monoethanolamides, diethanolamides and isopropanolamides.

Further suitable nonionic surfactants are alkyl- and alkenyloligoglycosides, and also fatty acid polyglycol esters or fatty amine polyglycol esters each having from 8 to 20, preferably from 12 to 18, carbon atoms in the fatty alkyl radical, alkoxylated triglycamides, mixed ethers or mixed formals, alkyloligoglycosides, alkenyloligoglycosides, fatty acid N-alkylglucamides, phosphine oxides, dialkyl sulfoxides and protein hydrolyzates.

Typical examples of amphoteric or zwitterionic surfactants are alkylbetaines, alkylamidobetaines, aminopropionates, aminoglycinates or amphoteric imidazolinium compounds of the formula

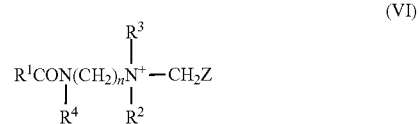

(VI)

in which $R^1$ is $C_8$-$C_{22}$-alkyl or -alkenyl, $R^2$ is hydrogen or $CH_2CO_2M$, $R^3$ is $CH_2CH_2OH$ or $CH_2CH_2OCH_2CH_2CO_2M$, $R^4$ is hydrogen, $CH_2CH_2OH$ or $CH_2CH_2COOM$, Z is $CO_2M$ or $CH_2CO_2M$, n is 2 or 3, preferably 2, M is hydrogen or a cation such as an alkali metal, alkaline earth metal, ammonium or alkanolammonium cation.

Preferred amphoteric surfactants of this formula are monocarboxylates and dicarboxylates. Examples thereof are cocoamphocarboxypropionate, cocoamidocarboxypropionic acid, cocoamphocarboxyglycinate (also referred to as cocoamphodiacetate) and cocoamphoacetate.

Further preferred amphoteric surfactants are alkyldimethylbetaines and alkyldipolyethoxybetaines with an alkyl radical having from approx. 8 to approx. 22 carbon atoms which may be linear or branched, preferably having from 8 to 18 carbon atoms and more preferably having from 12 to 18 carbon atoms.

Suitable cationic surfactants are substituted or unsubstituted, straight-chain or branched, quaternary ammonium salts of the $R^1N(CH_3)_3^+X^-$, $R^1R^2N(CH_3)_2^+X^-$, $R^1R^2R^3N(CH_3)^+X^-$ or $R^1R^2R^3R^4N^+X^-$ type. The $R^1$, $R^2$, $R^3$ and $R^4$ radicals are each independently preferably unsubstituted alkyl having a chain length of from 8 to 24 carbon atoms, in particular from 10 to 18 carbon atoms, hydroxyalkyl having from 1 to 4 carbon atoms, phenyl, $C_2$-$C_{18}$-alkenyl, $C_7$-$C_{24}$-aralkyl, $(C_2H_4O)_xH$ where x is an integer from 1 to 3, alkyl radicals comprising one or more ester groups, or cyclic quaternary ammonium salts. X is a suitable anion known to those skilled in the art.

Further laundry detergent and cleaning composition ingredients which may be comprised in the present invention comprise inorganic and/or organic builders in order to reduce the hardness of the water.

These builders may be comprised in proportions by weight of from about 5% to about 80% in the laundry detergent and cleaning compositions. Inorganic builders comprised, for example, alkali metal, ammonium and alkanolammonium salts of polyphosphates, for example tripolyphosphates, pyrophosphates and glass-like polymeric metaphosphates, phosphonates, silicates, carbonates including bicarbonates and sesquicarbonates, sulfates and aluminosilicates.

Examples of silicate builders are the alkali metal silicates, in particular those having an $SiO_2$:$Na_2O$ ratio between 1.6:1 and 3.2:1, and also sheet silicates, for example the sodium sheet silicates described in U.S. Pat. No. 4,664,839, available from Clariant GmbH under the SKS® brand. SKS-6® is a particularly preferred sheet silicate builder.

Aluminosilicate builders are particularly preferred for the present invention. These are in particular zeolites of the formula $Na_z[(AlO_2)_z(SiO_2)_y]\cdot xH_2O$ in which z and y are integers of at least 6, the ratio of z to y is from about 1.0 to 0.5, and x is an integer from 15 to 264.

Suitable ion exchangers based on aluminosilicate are commercially available. These aluminosilicates may be of crystalline or amorphous structure and may be naturally occurring or else produced synthetically. Processes for the production of ion exchangers based on aluminosilicate are, for example, described in U.S. Pat. No. 3,985,669 and U.S. Pat. No. 4,605,509. Preferred ion exchangers based on synthetic crystalline aluminosilicates are available under the name zeolite A, zeolite P (B) (including those disclosed in EP-A-0 384 070) and zeolite X. Preference is given to aluminosilicates having a particle diameter between 0.1 and 10 µm.

Suitable organic builders comprise polycarboxyl compounds, for example ether polycarboxylates and oxydisuccinates, as described, for example, in U.S. Pat. No. 3,128,287 and U.S. Pat. No. 3,635,830. Likewise suitable are the TMS/TDS builders known from U.S. Pat. No. 4,663,071.

Other suitable builders comprise the ether hydroxypolycarboxylates, copolymers of maleic anhydride with ethylene or vinyl methyl ether, 1,3,5-trihydroxybenzene-2,4,6-trisulfonic acid and carboxymethyloxysuccinic acid, the alkali metal, ammonium and substituted ammonium salts of polyacetic acids, for example ethylenediaminetetraacetic acid and nitrilotriacetic acid, and polycarboxylic acids such as mellitic acid, succinic acid, oxydisuccinic acid, polymaleic acid, benzene-1,3,5-tricarboxylic acid, carboxymethyloxysuccinic acid, and soluble salts thereof.

Builders based on citrate, e.g. citric acid and its soluble salts, in particular the sodium salt, are preferred polycarboxylic acid builders, which may also be used in granulated formulations, in particular together with zeolites and/or sheet silicates.

Further suitable builders are the 3,3-dicarboxy-4-oxa-1,6-hexanedioates and the related compounds which are disclosed in U.S. Pat. No. 4,566,984.

When builders based on phosphorus can be used and in particular when the intention is to formulate bar soaps for washing by hand, it is possible to use various alkali metal phosphates, for instance sodium tripolyphosphate, sodium pyrophosphate and sodium orthophosphate. It is likewise possible to use phosphonate builders such as ethane-1-hydroxy-1,1-diphosphonate and other known phosphonates, as disclosed, for example, in U.S. Pat. No. 3,159,581, U.S. Pat. No. 3,213,030, U.S. Pat. No. 3,422,021, U.S. Pat. No. 3,400,148 and U.S. Pat. No. 3,422,137.

In general, the detergent ingredients used with the polymer of the present invention are selected from components typical for detergent compositions, such as surface-active substances and builders. If appropriate, the detergent ingredients may comprise one or more detergent auxiliaries or other materials which enhance the cleaning action, serve for the treatment or care of the article to be cleaned or change the use properties of the detergent composition. Suitable detergent auxiliaries in detergent compositions comprise, for example, the substances specified in U.S. Pat. No. 3,936,537. The detergent auxiliaries which may be used in the detergent compositions of the present invention comprise, for example, enzymes, in particular proteases, lipases and cellulases, foam boosters, foam suppressors, discoloration and/or corrosion inhibitors, suspension media, dyes, fillers, optical brighteners, disinfectants, alkalis, hydrotropic compounds, antioxidants, enzyme stabilizers, perfumes, solvents, solubilizers, redeposition inhibitors, dispersants, dye transfer inhibitors, for example polyamine N-oxides, for instance poly(4-vinylpyridine N-oxide), polyvinylpyrrolidone, poly-N-vinyl-N-methyl-acetamide and copolymers of N-vinylimidazole and N-vinylpyrrolidone, processing auxiliaries, softeners and antistatic auxiliaries.

In addition to the polymer of the present invention, the detergent compositions may comprise one or more conventional enzymes, such as proteases, amylases, lipases and cellulases. A particularly preferred enzyme is cellulase. The cellulase used here may be obtained from bacteria or fungi and should have an optimum pH range between 5 and 9.5. Suitable cellulases are disclosed in U.S. Pat. No. 4,435,307. This is cellulase produced from a strain of *Humicola insolens*, in particular from the strain *Humicola* DSM 1800 or another cellulase-212-producing fungus which belongs to the *Aeromonas* genus, and also cellulase which has been extracted from the hepatopancreas of certain marine molluscs. Suitable cellulases are also disclosed in GB-A-2,075,028, GB-A-2,085,275 and DE-A-2,247,832.

Preferred cellulases are described in WO-91/17243. The inventive detergent compositions comprise enzymes in amounts up to about 50 mg, preferably from about 0.01 mg to about 10 mg, per gram of the detergent composition. Based on the weight of the detergent compositions, the proportion of the enzymes is at least 0.001% by weight, preferably from about 0.001% by weight to about 5% by weight, in particular from about 0.001% by weight to about 1% by weight, especially from about 0.01% by weight to about 1% by weight.

Machine Dishwasher Detergent Composition

Builders: It is possible to use water-soluble and water-insoluble builders whose main task consists in the binding of calcium and magnesium. Customary builders, which may be present in amounts between 10 and 90% by weight, based on the overall preparation, are listed below.

Phosphates, for example alkali metal phosphates and polymeric alkali metal phosphates, which may be in the form of their alkali, neutral or acidic sodium or potassium salts. Examples thereof are trisodium phosphate, tetrasodium diphosphate, disodium dihydrogenphosphate, pentasodium tripolyphosphate, what is known as sodium hexametaphosphate, oligomeric trisodium phosphate having degrees of oligomerization of from 5 to 1000, in particular from 5 to 50, and the corresponding potassium salts and mixtures of sodium hexametaphosphate and the corresponding potassium salts or mixtures of sodium and potassium salts. These phosphates are preferably used in the range from 25% by weight to 65% by weight, based on the overall formulation and calculated as anhydrous active substance.

Low molecular weight carboxylic acids and their salts, for example alkali metal citrates (for example anhydrous trisodium citrate or trisodium citrate dihydrate), alkali metal succinates, alkali metal malonates, fatty acid sulfonates, oxydisuccinates, alkyl or alkenyl disuccinates, gluconic acids, oxadiacetates, carboxymethyloxysuccinates, tartrate monosuccinate, tartrate disuccinate, tartrate monoacetate, tartrate diacetate, α-hydroxypropionic acid, oxidized starches, oxidized polysaccharides; homo and copolymeric polycarboxylic acids and their salts, for example polyacrylic acid, polymethacrylic acid, maleic acid/acrylic acid copolymer, maleic acid/acrylic acid/vinyl acetate copolymer; graft polymers of monoethylenically unsaturated mono- and/or dicarboxylic acids on monosaccharides, oligosaccharides, polysaccharides or polyaspartic acid; aminopolycarboxylates and polyaspartic acid; carbonates, for example sodium carbonate and sodium bicarbonate.

Complexing agents and phosphonates and salts thereof, for example nitrilotriacetic acid, ethylenediaminetetraacetic acid, diethylenetriaminepentaacetic acid, hydroxyethylethylenediaminetriacetic acid, methylglycinediacetic acid, 2-phosphono-1,2,4-butanetricarboxylic acid, aminotri(methylenephosphonic acid), 1-hydroxyethylene(1,1-diphosphonic acid), ethylenediaminetetramethylenephosphonic acid, hexamethylenediaminetetramethylenephosphonic acid and diethylenetriaminepentamethylenephosphonic acid.

Silicates, for example sodium disilicate and sodium metasilicate. Water-insoluble builders include the zeolites and crystalline sheet silicates, the latter corresponding in particular to the formula $NaMSi_xO_{2x+1}\cdot yH_2O$ where M is sodium or hydrogen, x is a number from 1.9 to 22, preferably from 1.9 to 4, and y is a number from 0 to 33. Known examples thereof are in particular $\alpha\text{-}Na_2Si_2O_5$, $\beta\text{-}Na_2Si_2O_5$, $\delta\text{-}Na_2Si_2O_5$. They likewise include mixtures of the abovementioned builder substances. Preference is given to using trisodium citrate and/or pentasodium tripolyphosphate and/or sodium carbonate and/or sodium bicarbonate and/or gluconates and/or silicatic builders from the class of disilicates and/or metasilicates.

Alkali Carriers:

Further constituents which may be present are alkali carriers. Alkali carriers used are alkali metal hydroxides, alkali metal carbonates, alkali metal hydrogencarbonates, alkali metal sesquicarbonates, alkali metal silicates, alkali metal metasilicates and mixtures of the above substances, preference being given to using the alkali metal carbonates, in particular sodium carbonate, sodium hydrogencarbonate or sodium sesquicarbonate. Preferred combinations of builder and alkali carrier are mixtures of tripolyphosphate and sodium carbonate or tripolyphosphate, sodium carbonate and sodium disilicate.

Surfactants:

Preference is given to using weakly foaming or low-foaming nonionic surfactants in amounts of from 0.1 to 20% by weight (preferably 0.1-10% by weight, 0.25-4% by weight). These are, for example, surfactants from the group of fatty alcohol ethoxylates, as are commercially available, for example, under the product names Plurafac® (BASF Aktiengesellschaft) or Dehypon® (Cognis). It is also possible to use di- and multiblock copolymers formed from ethylene oxide and propylene oxide, as are commercially available, for example, under the name Pluronic® (BASF Aktiengesellschaft) or Tetronic® (BASF Corporation). It is also possible to use reaction products of sorbitan esters with ethylene oxide and/or propylene oxide. Amine oxides or alkylglycosides are likewise suitable. An overview of suitable nonionic surfactants is given, for example, in EP-A 0 851 023 and DE-A 198 19 187.

The formulation can also comprise anionic or zwitterionic surfactants, preferably in a mixture with nonionic surfactants. Suitable anionic and zwitterionic surfactants are likewise mentioned in the specifications EP-A 0 851 023 and DE-A 198 19 187.

Corrosion Inhibitors:

in particular, it is possible to use silver protectants from the group of triazoles, benzotriazoles, bisbenzotriazoles, aminotriazoles, alkylaminotriazoles and the transition metal salts or complexes. Particular preference is given to using benzotriazole and/or alkylaminotriazole. In addition, agents containing active chlorine are frequently found in detergent formulations and are able to significantly reduce corrosion on silver surfaces. In chlorine-free detergents, preference is given to using oxygen- and nitrogen-containing organic redox-active compounds, such as di- and trifunctional phenols, e.g. hydroquinone, pyrocatechol, hydroxyhydroquinone, gallic acid, phloroglucine, pyrogallol, and derivatives of these compound classes. Salt- and complex-like inorganic compounds, such as salts of the metals Mn, Ti, Zr, Hf, V, Co and Ce frequently also find use. Preference is given here to the transition metal salts which are selected from the group of manganese and cobalt salts and complexes thereof, particular preference being given to cobalt(ammine) complexes, cobalt(acetate) complexes, cobalt(carbonyl) complexes, chlorides of cobalt and of manganese and of manganese sulfate. It is also possible to use zinc compounds or bismuth compounds for preventing corrosion on the ware.

Enzymes:

Between 0 and 5% by weight of enzymes, based on the overall preparation, may be added to the detergent composition in order to increase the performance of the detergent compositions or, under milder conditions, to ensure cleaning performance in equal quality. The most frequently used enzymes include lipases, amylases, cellulases and proteases. It is also possible to use esterases, pectinases, lactases and peroxidases. Preferred proteases are, for example, BLAP® 140 from Biozym, Optimase® M-440 and Opticlean® M-250 from Solvay Enzymes; Maxacal® CX and Maxapem® or Esperase® from Gist Brocades or Savinase® from Novo or Purafect OxP from Genencor. Particularly suitable cellulases and lipases are Celluzym® 0.7 T and Lipolase® 30 T from Novo Nordisk. The amylases which are used in particular are Duramyl® and Termamyl® 60 T, and Termamyl® 90 T from Novo, Amylase-LT® from Solvay Enzymes, Maxamyl® P5000 from Gist Brocades or Purafect® OxAm from Genencor. It is also possible to use other enzymes.

Further Additives:

Paraffin oils and silicone oils may optionally be used as antifoams and for the protection of plastic and metal surfaces. Antifoams are generally added in amounts of from 0.001% to 5%.

The polymer of the present invention can be used in detergent formulations both for the household sector and also for the industrial sector. Industrial types of detergent mostly comprise a builder system based on pentasodium triphosphate, and/or sodium citrate and/or complexing agents, for example nitrilotriacetate. In contrast to household detergents, they are frequently used with sodium hydroxide solution or potassium hydroxide solution as alkali carrier.

The polymer of the present invention can be used in dishwasher detergents in the form of gel, powder, granules or tablets. It is possible to incorporate the polymer of the present invention, if appropriate with other formulation constituents, into particular compartments, for example microcapsules, gel capsules. Furthermore, the polymer of the present invention can also be incorporated into specific compartments within dishwasher detergent tablets which may be able to exhibit different dissolution behavior to that of the other tablet compartments. These may either be particular tablet layers, or particular moldings incorporated into the tablet, adhesive-bonded to the tablet or surrounded by the tablet.

The invention will now be illustrated in detail with reference to the examples which follow.

EXAMPLES

Polyethyleneimines (MW 800 g/mol) in which the proportion of A1, A2 and A3 is in each case 0.33 are converted to the nitrile adduct and subsequently quaternized by means of dimethyl sulfate. Subsequently, the bleaching characteristics in comparison to tetraacetylethylenediamine (TAED) and methylmorpholinioacetonitrile hydrogensulfate (Sokalan® BMG, BASF AG) is investigated in wash experiments at 25° C. and 50° C.

Specifically, 113 g (1.67 mol) of Lupasol FG (AN=829.9 mg KOH/g) together with 110 g of water are initially charged. With cooling, 57.2 g (2.12 mol) of hydrocyanic acid and 221.3 g (2.11 mol) of 30% formaldehyde solution in water are subsequently added dropwise in parallel at room temperature within approx. 30 min. Subsequently, the mixture is stirred at room temperature for 60 min. The excess hydrocyanic acid is stripped with $N_2$ at room temperature for 30 min and a pH of 6.9 is then established with 11 g of 50% sulfuric acid.

Analysis: 1.9% formaldehyde cyanohydrin secondary component; <0.1% free hydrocyanic acid The yield is 492 g. The mixture is divided and reacted with 50 mol % [1], 75 mol % [2], 100 mol % [3] and 120 mol % [4], of dimethyl sulfate.

This is done by warming the initial charge to 30° C. and adding the appropriate amount of dimethyl sulfate dropwise at 28-32° C. with ice bath cooling. The pH is kept at from 3.7 to 3.9 with 50% NaOH. Subsequently, the mixture is stirred for a further 30 min.

Standard test in a launderometer with 5% activator addition at 25° C. and 50° C. of tea-, red wine-, grass- and curry-stained fabric. In addition, the removal of triolein and olive oil stains from cotton fabric is investigated. To this end, triolein and olive oil are dyed with 0.1% Sudan red 7 B (=Solvent Red 19). This dye is dissolved and homogenized beforehand with gentle warming. The preparation is effected by adding dropwise with a pipette, in the course of which the test fabric is stretched. 0.1 g of the solution is added dropwise and spreads on the fabric overnight. All test specimens are determined twice.

To this end, 15% by weight of bleach (sodium percarbonate) and 1.2 and 5% by weight of the appropriate activator are mixed into a commercial color laundry detergent which is homogenized in dry form.

The bleaching experiments in the launderometer are evaluated by reflectance measurement and calculation of the bleaching action on the bleachable stains used (tea, red wine, grass, curry, triolein and olive oil). The standard deviation of the reflectance R is <1%.

| Wash conditions | |
|---|---|
| Washing machine | Launder-O-meter |
| Water hardness | 3 mmol $Ca^{++}$ + $Mg^{++}$/l = 16.8° GH |
| Ca:Mg:$NaHCO_3$ ratio | 4:1:8 mol |
| Wash temperature 1 | 25° C. |
| Wash temperature 2 | 50° C. |
| Wash time | 30 min |
| Wash cycles | 1 in each case |
| Laundry detergent dosage | 4.5 g/l |
| Liquor ratio | 1:20 |
| Total liquor | 250 ml |
| Fabric | 2.5 g of cotton/tea |
| | 2.5 g of cotton/red wine (EMPA 114) |
| | 2.5 g of cotton/grass (CFT-AS 4, chlorophyll-vegetable oil) |

Fabric Preparation

For the EMPA 114 bleaching fabric, a fabric charge has to be applied in the evaluation program (CGTec). Commercially unavailable stains such as tea, chlorophyll were premeasured individually.

Hardness

Mixing of stock hardness 1 ($Ca^{++}$+$Mg^{++}$) and stock hardness 2 ($NaHCO_3$), both 0.8 mol/l in each case. Hard water is tested before use. The water hardness is determined by using Titriplex solution.

Stock hardness 1 94.09 g of calcium chloride $2H_2O$ and 32.53 g of magnesium chloride. $6H_2O$, make up to 1 liter with demineralized water in a standard flask Stock hardness 2 67.2 g of sodium hydrogencarbonate, make up to 1 liter with demineralized water in a standard flask Hard water 1: 39.06 g of stock hardness 1, make up to 1 l with demineralized water Hard water 2 62.50 g of stock hardness 2, make up to 1 l with demineralized water Rinse water is drinking water

| Washing | |
|---|---|
| 25° C. wash: | |
| Start temperature | 25° C. |
| Wash temperature | 25° C. for 30 min |
| End temperature | 25° C. |
| 50° C. wash: | |
| Start temperature | 25° C., heating time 10 min (2.5° C./min) |
| Wash temperature | 50° C. for 20 min |
| End temperature | 25° C., approx. 6 min cooling time |

In Table 1 below, the results are compiled.

For all bleaching test fabrics, a distinct activity of the polymers of the present invention as bleach activators can be detected and is superior to bleach activators from the prior art at least for certain stains. Especially in the case of hydrophobic stains, the inventive bleach activators exhibit a higher activity in comparison to activators according to the prior art, in particular at low temperatures (25° C.).

TABLE 1 at 25° C. and 1% bleach activator; reflectance values in %

| | Bleach activator | | | | | | |
|---|---|---|---|---|---|---|---|
| | None | TAED | BMG | [1] | [2] | [3] | [4] |
| Average molar mass $M_W$ [g/mol] | — | 244 | 141 | 2000 | 2100 | 2200 | 2300 |
| Proportion of monomer units having two or three methyl groups [%] | — | — | 0 | 10 | 10 | 15 | 15 |
| Degree of quaternization [%] | — | — | 100 | 25 | 50 | 80 | 100 |
| Red wine | 54.6 | 58.4 | 61.8 | 57.5 | 57.5 | 56.2 | 56.9 |
| Tea | 29.9 | 34.5 | 48.5 | 38.0 | 38.0 | 39.3 | 38.4 |
| Grass | 39.8 | 39.2 | 40.1 | 39.9 | 39.9 | 40.9 | 40.5 |
| Curry | 63.7 | 65.1 | 69.2 | 67.6 | 68.6 | 68.0 | 67.7 |
| Triolein | 44.1 | 42.6 | 42.2 | 45.5 | 45.5 | 45.8 | 42.9 |
| Olive oil | 39.1 | 40.0 | 39.9 | 41.9 | 45.1 | 45.3 | 43.2 |

At 50° C., comparable bleach activations in relation to TAED and BMG are found.

What is claimed is:

1. A polymer comprising the monomer units

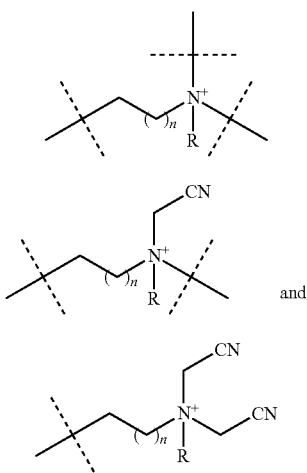

where n is an integer from 1 to 4, R is a branched or unbranched, saturated or unsaturated, optionally oxygen-interrupted hydrocarbyl radical having from 1 to 20 carbon atoms, and the dashed lines in monomer units A1, A2 and A3 indicate attachment points to other monomer units.

2. The polymer according to claim 1, which is based on polyalkyleneimine.

3. The polymer according to claim 1, which has an average molecular mass in a range from 500 g/mol to 500 000 g/mol.

4. The polymer according to claim 1, wherein n=1 and/or R is $C_1$-$C_{20}$ alkyl.

5. The polymer according to claim 1, which has a log P value of from −3 to 6.5.

6. The polymer according to claim 1, wherein the polymer further comprises uncharged monomer units and wherein the ratio of positively charged monomer units to uncharged monomer units is at least 0.25.

7. The polymer according to claim 1, wherein the polymer further comprises monomer units other than A1, A2 and A3 and wherein R is present two or three times in at most 25% of such monomer units.

8. The polymer according to claim 1, wherein the proportion of each of the monomer units A1, A2, A3 in the polymer is in each case independently in the range from 0.01 to 0.5.

9. A process for preparing a polymer according to claim 1, comprising
a) reacting a polymer comprising the monomer units

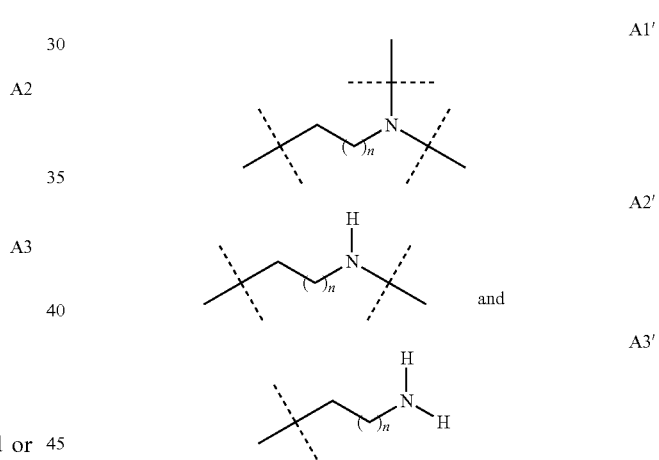

where n is an integer from 1 to 4 with hydrogen cyanide and formaldehyde, and the dashed lines in monomer units A1, A2 and A3 indicate attachment points to other monomer units;

b) reacting the product from a) with a reagent for introducing the R group, R being a branched or unbranched, saturated or unsaturated, optionally oxygen-interrupted hydrocarbyl radical having from 1 to 20 carbon atoms.

10. A method of textile bleaching or paper bleaching, comprising contacting textile or paper with a bleaching composition comprising the polymer according to claim 1.

11. The polymer according to claim 1, which is based on polyethyleneimine.

12. The polymer according to claim 11, wherein R is selected from the group consisting of methyl, ethyl, n-propyl, isopropyl, n-butyl, isobutyl and tert-butyl and wherein n is 1 in all of A1, A2 and A3.

13. The polymer according to claim 1, wherein R is selected from the group consisting of methyl, ethyl, n-propyl, isopropyl, n-butyl, isobutyl and tert-butyl.

14. The polymer according to claim 1, wherein n is 1 in all of A1, A2 and A3.

15. A bleaching composition, comprising the polymer according to claim 1 as a bleach activator.

16. The bleaching composition as claimed in claim 15, further comprising a bleach.

* * * * *